United States Patent [19]

Winner et al.

[11] Patent Number: 5,588,718
[45] Date of Patent: Dec. 31, 1996

[54] VEHICLE HYDRAULIC BRAKE SYSTEM OPERATING WITH POWER ASSISTANCE

[75] Inventors: Hermann Winner; Alain Gaillard, both of Karlsruhe, Germany

[73] Assignee: Robert Bosch GmbH, Stuttgart, Germany

[21] Appl. No.: 454,331

[22] PCT Filed: Nov. 2, 1994

[86] PCT No.: PCT/DE94/01287

§ 371 Date: Jun. 16, 1995

§ 102(e) Date: Jun. 16, 1995

[87] PCT Pub. No.: WO95/14595

PCT Pub. Date: Jun. 1, 1995

[30] Foreign Application Priority Data

Nov. 27, 1993 [DE] Germany .......................... 43 40 467.7

[51] Int. Cl.[6] .................. B60T 8/32; B60T 8/48; B60T 8/60; B60T 13/12
[52] U.S. Cl. ............ 303/113.1; 303/14; 303/116.1; 303/119.1; 303/113.4; 303/114.1
[58] Field of Search ............... 303/113.1, 155, 303/13, 14, 15, 16, 17, 3, 113.4, 10–12, 166, DIG. 3, DIG. 4, 900, 901, 114.1, 114.2, 114.3, 115.1, 115.5, 116.1, 116.2, 119.1; 188/355–359

[56] References Cited

U.S. PATENT DOCUMENTS

| | | |
|---|---|---|
| 4,462,642 | 7/1984 | Leiber . |
| 4,812,777 | 3/1989 | Shirai ......................................... 303/14 |
| 4,902,075 | 2/1990 | Uno et al. . |
| 5,031,968 | 7/1991 | Takata ......................................... 303/155 |
| 5,443,306 | 8/1995 | Broome .................................. 303/113.4 |

FOREIGN PATENT DOCUMENTS

| | | |
|---|---|---|
| 0187901 | 7/1986 | European Pat. Off. . |
| 0265623 | 5/1988 | European Pat. Off. . |
| 0526882A1 | 2/1993 | European Pat. Off. . |
| 2538328 | 6/1984 | France . |
| 2566729 | 1/1986 | France . |
| 1964926 | 7/1970 | Germany . |
| 4029793A1 | 3/1992 | Germany . |
| 4102497C1 | 5/1992 | Germany . |
| 2183763 | 6/1987 | United Kingdom . |
| 2218783 | 11/1989 | United Kingdom . |

Primary Examiner—Douglas C. Butler
Attorney, Agent, or Firm—Edwin E. Greigg; Ronald E. Greigg

[57] ABSTRACT

The invention relates to a vehicle hydraulic brake system with a twin-circuit emergency brake pressure source which can be put into operation by a pedal and with wheel brakes which can be supplied from this emergency brake pressure source through emergency brake main conduits and with a power-assisted brake device which has a power source, and, between the latter and the at least one wheel brake, at least one valve arrangement generates brake pressures and also reduces brake pressure using a pressure medium from the power source. At least one valve arrangement is installed between the emergency brake pressure source and the wheel brakes and, in emergency brake operation, this valve arrangement connects the emergency brake pressure source to the wheel brakes and, in power-assisted brake operation, separates the emergency brake pressure source from the wheel brakes. This valve arrangement is designed in such a way that in power-assisted brake operation, the valve arrangement permits pressure medium which has to be drained from wheel brakes to escape to a reservoir of the emergency brake pressure source through the emergency brake main conduits and a return conduit. This valve arrangement can be controlled by a small control force and is therefore of low cost. The vehicle brake system is suitable for motor vehicles.

17 Claims, 2 Drawing Sheets

VEHICLE HYDRAULIC BRAKE SYSTEM OPERATING WITH POWER ASSISTANCE

The invention is based on a vehicle brake system as set forth hereinafter.

A hydraulic power-assisted brake system integrated in a wheel brake is known from the publication EP 0 025 714 A1. This has a power source with a reservoir, with a pump and with a pressure accumulator and an electrically controllable brake pressure setting valve, with an electromagnet and a brake pedal with an electrical sensor, and the system has an anti-lock control unit for controlling the brake pressure setting valve. An electrical converter which acts on the brake pressure setting valve can be adjusted by actuating the brake pedal. If the danger of wheel lock occurs when a brake pressure is set by actuation of the brake pedal, by means of the brake pressure setting valve, the anti-lock control unit drives the brake pressure setting valve against what is specified by the converter in order to reduce the brake pressure until such time as the danger of wheel lock is obviated. In the case of a failure of an electrical current supply to the pump and/or to the electrical converter and/or even to the anti-lock control unit, the relevant wheel brake fails. If the remaining wheel brakes of the same vehicle are connected to the same electricity supply, a failure of the electrical current supply causes a complete failure of the vehicle hydraulic brake system.

Vehicle hydraulic brake systems are known from the publications EP 0 265 623 A2, DE 40 29 793 A1, DE 31 31 856 A1, U.S. Pat. No. 4,462,642 and U.S. Pat. No. 4,902,075 which normally operate as electrically controllable power-assisted brake systems but which can be operated by muscle force in the case of a failure of power assistance by using, in each case, a twin-circuit emergency brake pressure generator which is, for example, configured as a normal main brake cylinder and which can be actuated by means of a brake pedal, with the support, for example, of a vacuum-operated servo brake, as is revealed in DE 40 29 793 A1. In accordance with EP 0 265 623 A2, electrically operating sensors intended for the electrical control of brake pressures are configured, for example, as a pedal force sensor (which is mechanically coupled to the brake pedal) or as a pressure sensor (which is connected to the emergency brake pressure generator). So-called displacement simulators are connected to the emergency brake pressure generators so that the driver experiences brake pedal displacements of comfortable length during power-assisted brake operation. In accordance with EP 0 265 623 A2 or DE 31 31 856 A1, for example, these displacement simulators can be switched on and off by valves and include cylinders, simulator pistons and simulator springs.

A vehicle hydraulic brake system with a main brake cylinder, which is known from the publication DE 41 02 496 A1, is further developed in order to generate wheel brake cylinder pressures with the aid of at least one pump and at least one change-over valve arrangement which can be controlled electrically. The electrical control takes place on the basis of signals which are proportional to the forces exerted on the brake pedal. Apart from the force or pressure sensors quoted for this purpose, DE 41 02 946 A1 mentions resistive and inductive displacement pick-ups and the measurement of a pedal actuation displacement. In a vehicle brake system operating with power assistance and using magnetic valves, EP 0 389 993 A1 reveals setting the brake pressure as a specified ratio of the brake pedal stroke. A brake pedal stroke detector provided for this purpose is represented as a potentiometer with a resistance track curved around the pivoting axis of the brake pedal.

Electrically controllable valves for the setting and/or relay of brake pressures and for shutting off the emergency brake pressure generators, and arranged between such power sources, the emergency brake pressure generators and the wheel brakes, can be configured in various ways as 2/2-way valves, 3/2-way valves, 3/3-way valves and 4/4-way valves, as revealed in EP 0 265 623 A2 and DE 31 24 755 A1. In contrast, a special feature of the vehicle brake system of DE 40 29 793 A1 consists in the fact that such 2/2-way valves, which are used for increasing and reducing brake pressures, are configured as throttling directional valves and can therefore be driven into an infinite number of intermediate positions between two outer end positions (infinite positioning). This has the advantage that different pressure change rates can be generated without hydraulic jolts in the wheel brake by means of variable throttling. In addition to the steplessly adjustable 2/2-way valves, 3/3-way valves are mentioned. The latter are configured as seat valves because of the leak-tightness necessary in the shut-off position. Pressure sensors for measuring the wheel brake pressures are present so that, by comparing the indications of these pressure sensors with the indication of a pressure sensor connected to the main brake pressure generator and taking account, for example, of an amplification factor which can be increased, brake pressures can be regulated by switching on a control unit which acts on the valves.

Apart from providing servo operation, the control unit can be additionally arranged to carry out anti-lock protection and drive-slip limitation functions and to carry out vehicle dynamics adaptation by means of the vehicle brake system.

For vehicle brake systems, EP 0 265 623 A2 provides the functions of servo brake, anti-lock protection and drive-slip control functions and, in addition, braking force distribution (control power distribution), stop braking (stop retention), distance braking (vehicle-to-vehicle distance control) and braking before an obstacle (obstacle avoidance) as well as automatic braking for various purposes.

For a brake system which operates with power assistance and which also has a brake cylinder actuated by brake pedal, the Japanese Publication No. 49,474/79 of 18 Apr. 1979 in accordance with the Japanese Patent Application No. 115, 796/77 of 27 Sep. 1977, reveals electrically controllable 4/3-way proportional/directional valves for setting brake pressures.

Many of the known vehicle brake systems have, inter alia, the feature that pressure medium return conduits are connected to electrically controllable wheel brake pressure reduction valves. These return conduits lead to reservoirs with fluid levels above the emergency brake pressure generators and are therefore designed as so-called openable brake circuits. The technical complication involved in the pressure medium return conduits and in laying them in the vehicles so that they extend above the fluid levels of the reservoirs is disadvantageously large, particularly where the elements used for the power-assisted brake operation, such as directional valves, can only be accommodated remote from the emergency brake pressure generators. Advantages of the invention The vehicle brake system according to the invention has the advantage that quantities of pressure medium which were previously supplied from the power source and which have to be led away from the wheel brakes during power-assisted operation or at the end of power-assisted brake operation, flow through the respective emergency brake conduit as far as the valve arrangement for selecting the brake pressure source and, from there, finally reach the reservoir through the special return conduit. It may be seen that essentially only flow resistances have to be overcome during such drainage of fluid to the reservoir and it may therefore be recognized that during power-assisted brake operation, the emergency brake conduits can never attain the pressure which is stored in the power source. In consequence, the valve arrangements installed in the emergency brake conduits for selecting the brake pressure source can be provided with increased flow cross-sections and stronger valve springs and stronger electromagnets are not required.

Advantageous further developments and improvements to the vehicle brake system are possible by means of the measures listed herein. The inventive features provide a low-cost construction of the valve arrangement which is used for generating and changing brake pressures during power-assisted brake operation. This valve arrangement consists of so-called two-position valves constructed in a simple manner. The inventive features further provide the advantage that relatively weak valve springs and, accordingly, relatively weak electromagnets can be used because the by-passes and the non-return valves permit quantities of pressure medium to drain to the emergency brake pressure source when the pedal is released even though the respectively associated and normally open 2/2-way valve may no longer take up its widest open position because of flow through it. The inventive features provide a further configuration possibility for those valve arrangements which are used for selecting the brake pressure source. The inventive features also provide a low-cost embodiment example which uses 2/2-way valves. A further advantage resides in that it is possible to control rates of pressure increase and rates of pressure decrease for the wheel brakes in a practically infinitely variable manner and, in consequence, without jolts. A further embodiment sets forth a valve arrangement by means of which brake pressures can be generated or set. A still further advantage resides in that brake pressure rates which increase and brake pressure rates which decrease can, for example, be changed in an infinitely variable manner and, in consequence, practically without jolts. The invention provides the advantage, known per se, of good sealing of the valve arrangements and simultaneously ensure that compensation is provided for flow cross-sectional contractions, with disadvantageous flow hindrance, possibly caused by flow through the unit.

In accordance with a principle of action known per se, an intact brake circuit is prevented from being emptied by another brake circuit which has developed a leak. A further development with provides the advantage that two normally closed 2/2-way valves are arranged in series between the power source and each of the wheel brakes to be supplied from it. This provides the advantage of improved security against unintentional filling of the wheel brakes by means of fluid from the power source. On the other hand, the use of a spool valve, for example, within the valve arrangement used for brake pressure generation or brake pressure change, this spool valve being very suitable for further development as a proportional valve.

Another is that rates of increase of pressure in the wheel brakes can be changed in steps in a relatively low-cost manner. In this way, it is possible to economize in the costs involved in the further development of directional valves to provide proportional directional valves.

Further features provide the advantage that elastic flexibility of the brake pedal is present during power-assisted brake operation; this facilitates sensitive setting of brake pressures. A low-cost design is set forth for generating required brake pressure values based on the fact that a desired elastic flexibility of the pedal is effected. It may be seen that a power-assisted brake system can be further developed for additional modes of operation with little additional technical complication.

BRIEF DESCRIPTION OF THE DRAWINGS

The vehicle hydraulic brake system according to the invention is shown in the drawing and is explained in more detail in the following description.

DESCRIPTION OF THE EMBODIMENT EXAMPLES

Figure 1:
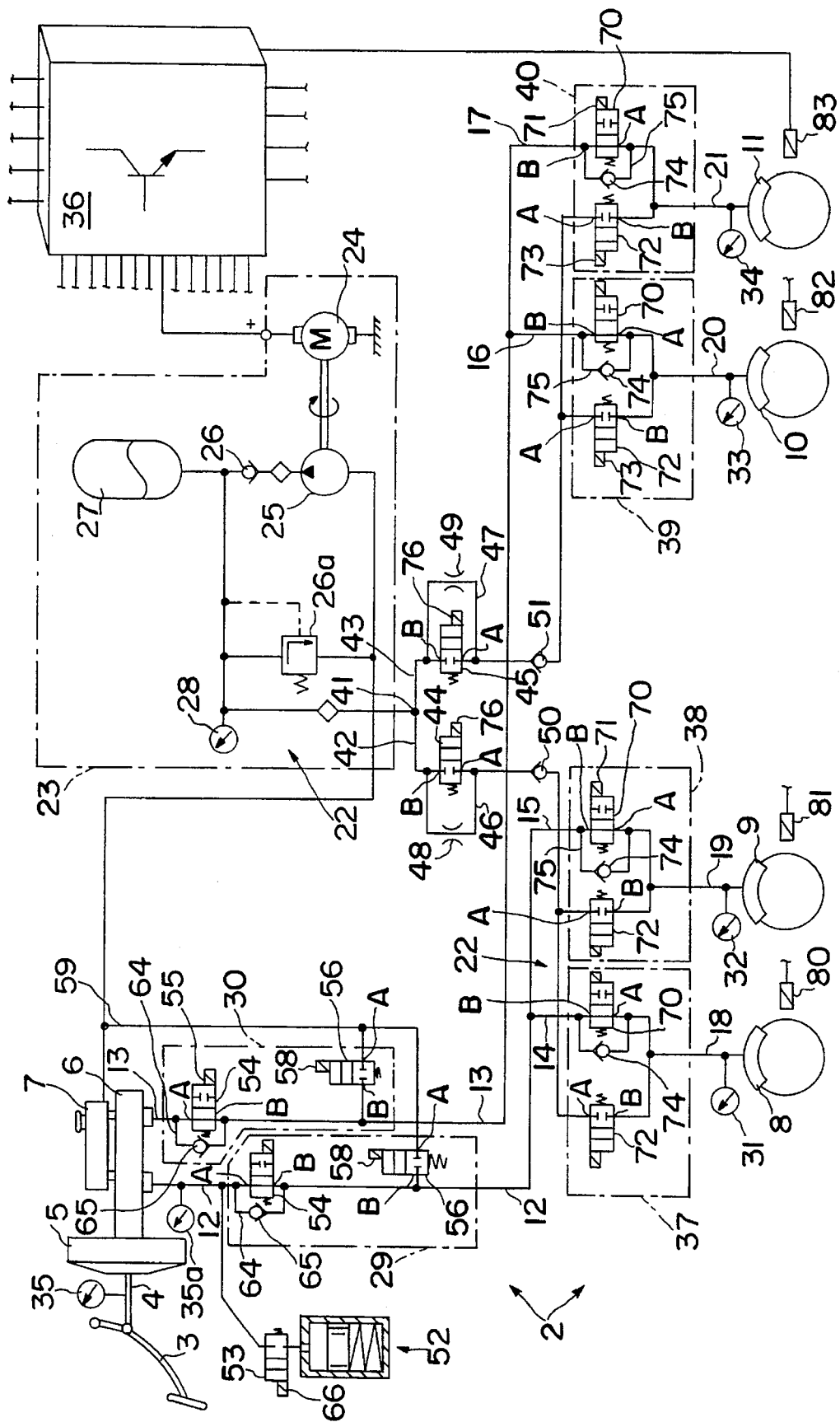
FIG. 1 shows a circuit diagram for the vehicle brake system according to the invention.

The vehicle hydraulic brake system 2 shown in the circuit diagram of FIG. 1 has a pedal 3, a pedal rod 4, a so-called vacuum-operated servo brake 5, for example, an emergency brake pressure source 6 which is configured, for example, in the form of a commercially available twin-circuit brake cylinder with a reservoir 7, four wheel brakes 8, 9, 10, 11, for example, which can be arbitrarily distributed among the front and rear wheels of a vehicle, emergency brake main conduits 12, 13 laid in twin circuits, emergency brake conduits 14 to 17 connected to the emergency brake main conduits 12, 13, wheel brake conduits 18, 19, 20, 21 and, as the power-assisted brake device 22, a power source 23 with a driving motor 24, a pump 25, a non-return valve 26 downstream of the pump 25, a power reservoir 27 in the form of an accumulator downstream of the non-return valve, a pressure monitor 28 communicating the power reservoir 27 and with a safety valve 26a connected to the power reservoir 27.

One valve arrangement 29, 30 for the selection of a brake pressure source is provided for each brake circuit. For the four wheel brakes 8 to 11, there are, for example, four wheel brake pressure sensors 31, 32, 33, 34, a required brake pressure value generator 35 controlled by means of the pedal 3, a control unit 36 connected to the required brake pressure value generator 35 and the wheel brake pressure sensors 31 to 34, four valve arrangements 37, 38, 39, 40 which are electrically controllable by the control unit 36, a branch 41 supplied from the power source 23 and, starting from the branch 41, two power conduits 42, 43, normally closed 2/2-way valves 44 and 45 with by-passes 46 and 47 respectively installed in the power conduits 42 and 43 and throttles 48 and 49 respectively located in the by-passes 46 and 47, and non-return valves 50 and 51 which are preferably located downstream of the 2/2-way valves 44 and 45 and their by-passes 46 and 47 and which can be opened by means of pressure from the power source 23, a displacement simulator 52 and a displacement simulator connecting valve 53 connected with the main conduit 12.

As shown in FIG. 1, the valve arrangements 29, 30 contain normally open 2/2-way valves 54 which are installed in the emergency brake main conduits 12, 13 and which are, for example, electrically controllable by means of electromagnets 55 and they contain further 2/2-way valves 56 which are introduced between the emergency brake main conduits 12 and 13 and the reservoir 7, which are normally closed and which can likewise be controlled by electromagnets 58. There is a return conduit 59 between these 2/2-way valves 56 and the reservoir 7.

Figure 2:
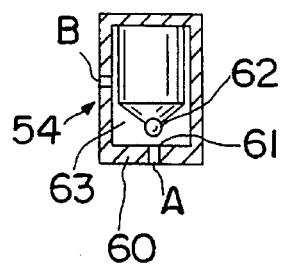
FIGS. 2 and 3 show connections for the directional valves configured as seat valves and FIGS. 4, 5, 6 and 7 shows configurations of valve arrangements which can be alternatively installed in the vehicle brake system of FIG. 1.

A valve chamber 60, for the 2/2-way valve 54, with a connection A and a connection B is represented in a simplified manner in FIG. 2. The connection A is associated with a valve seat 61 and a connection B is associated with a valve closing element 62, for example a ball, which can be pressed onto the valve seat 61, and a valve space 63 which accommodates the valve closing element 62. In a manner which supports the invention, each connection A is connected to the emergency brake pressure source 6 by the emergency brake main conduit 12 or 13. Viewed from the direction of the emergency brake pressure source 6, the respective connection B is correspondingly located behind the respective 2/2-way valve 54.

Figure 3:
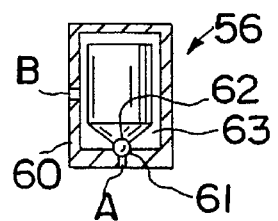

The 2/2-way valve 56 is diagrammatically represented in an analogous manner in FIG. 3. It again has a valve chamber 60, a valve seat 61, a valve closing element 62 and a valve space 63. A difference from the normally open 2/2-way valve 54 of FIG. 2 is that the 2/2-way valve 56 of FIG. 3 is normally closed. This can be recognized in FIG. 3 because the valve closing element 62 is seated on the valve seat 61. In a similar manner, a connection associated with the valve seat 61 is again designated by A and a connection opening into the valve space 63 is again designated by B. In a manner which supports the invention, the connections A of the two valves 56 are connected to the reservoir 7. In contrast, the connections B of these 2/2-way valves 56 are connected to the respective emergency brake main conduit 12 or 13. This allocation of the connections provides the advantage that, for example, an emergency brake pressure in the emergency brake main conduits 12 and 13 loads the 2/2-way valves 56 in the closing direction and, by this means, avoids the danger of a disadvantageous drainage of pressure medium from the emergency brake pressure source 6 in the direction of the reservoir 7. In the case of the 2/2-way valve 54 installed in the emergency brake main conduits 12 and 13, the arrangement has the advantage that a rapidly generated pressure in the emergency brake pressure source 6 acts in the opening direction on the 2/2-way valves 54 so that a reliable supply is possible to the wheel brakes 8 to 11.

By-passes 64 with built-in non-return valves 65 are laid around the normally open 2/2-way valves 54. The non-return valves 65 are then installed in such a way that they can be opened in the direction towards the emergency brake pressure source 6. Installing the non-return valves 65 and the by-passes 64 in this way is advantageous to the extent that, in the case of an abrupt reduction of the emergency brake pressure by sudden release of the pedal 3, fluid emerging from the wheel brakes 8 to 11 flows back rapidly to the emergency brake pressure source 6 and hydrodynamic forces then occur which may possibly act in the closing direction on the valve closing elements 62 with the danger, which cannot be completely excluded, that these elements close if, for some reason, the opening springs have a weak configuration or if the opening springs are broken. In such a case, a reduction of emergency brake pressure is possible by means of the respective non-return valve 65.

In FIG. 1, the 2/2-way valves 54 have electromagnets 55 to actuate them and the control unit 36 acts on these electromagnets 55. For completeness, it should be mentioned that hydraulic control in accordance with the prior art is also possible with the aid of pressure from the power source 23, instead of control of the electromagnets 55. In accordance with the possibilities quoted of selecting hydraulic or electromagnetic control, the displacement simulator connecting valve 53 can be opened by its own electromagnet 66 by means of the control unit 36 for the power-assisted brake operation, as is apparent from the publication DE 31 856 A1, in particular. Alternatively, however, as has already been mentioned with respect to the 2/2-way valve 54, the displacement simulator connecting valve 53 can be likewise controlled hydraulically. The possibility of selecting between electrical control and hydraulic control also applies, of course, to the 2/2-way valves 56, which can have the electromagnets 58 already mentioned and which are opened towards the return conduit 59 and to the reservoir 7 for power-assisted brake operation.

Each of the valve arrangements 37, 38, 39 and 40 consists, in the embodiment example of FIG. 1, of a normally open 2/2-way valve 70 between the valve arrangement 29 or 30 and the respective wheel brakes of the wheel brakes 8 to 11. The 2/2-way valve 70 has an electromagnet 71 for its operation by means of the control unit 36 in power-assisted brake operation. In addition, the valve arrangements 37 to 40 each have a second 2/2-way valve 72 which is normally closed and which can be driven into the open position by the control unit 36 by means of an electromagnet 73. As in the case of the 2/2-way valves 54 and 56, the letters A provide the valve connection at the valve-seat end and the letters B the connections at the valve-space end. Because the connections A have a connection at the power source end, their opening procedure is supported by the pressure from the power source 23 in the direction towards the respective wheel brake 8, 9, 10 or 11. Because of the connection of the valve connections A of the normally open 2/2-way valves 70 via the wheel brake conduits 18 and 19, 20 and 21 to the respective wheel brake 8, 9, 10 or 11, pressure drops act from the wheel brakes 8, 9, 10, 11 mentioned in the direction towards the emergency brake conduits 14 and 15, 16, 17 and also, in consequence, towards the emergency brake main conduits 12 and 13 so as to support the open positions of these 2/2-way valves 70. Because, in consequence, a pressure drop from pressures present, during emergency brake operation, in the emergency brake main brake conduits 12 and 13 towards the wheel brakes 8 and 9, 10, 11 could act in the closing direction in the 2/2-way valves 70 when the pedal 3 is actuated, by-passes 75 containing nonreturn valves 74 are laid around these 2/2-way valves 70.

The overall result is that the valve arrangements 37 to 40 have, in practice, three undesignated connections towards the outside which are connected to the emergency brake conduits 14 to 17, the wheel brake conduits 18 to 21 and the two non-return valves 50 and 51.

The respective valve arrangements 37 to 40 are also connected to the wheel brake pressure sensors 31 to 34 by the wheel brake conduits 18 to 21.

As already indicated, the supply to the valve arrangements 37 to 40 takes place through the non-return valves 50 and 51 which, as already mentioned, are supplied with power through the power conduits 42 and 43 and the branch 41. The non-return valves 50 and 51 have the effect that once pressure medium has been introduced into the wheel brakes 8 to 11, it cannot pass back into the power source 23.

At the same time, these non-return valves 50 and 51 also prevent pressure medium from draining unintentionally from the wheel brakes 8 and 9, for example, into the wheel brakes 10 and 11 or vice versa. This also achieves the effect that should the wheel brake conduit 20 of the wheel brake 10 develop a leak, for example, this does not empty the wheel brakes 8 and 9.

In the usual manner, the throttles 48 and 49 have the effect that pressure medium flowing from the power reservoir 27 to the non-return valves 50 and 51 can only increase up to a desired magnitude. On the other hand, the 2/2-way valves 44 and 45 which are respectively connected in parallel with the throttles 48 and 49 can, when open, form by-passes around the throttles 48 and 49 and by this means, for example in the case of a drop in power-assisted brake pressure, can ensure sufficiently large flow quantities through the non-return valves 50 and 51. It follows that the respective combinations of the 2/2-way valves 44 and 45 and the throttles 48 and 49 can be used for varying the flow quantities through the non-return valves 50 and 51 as a function of the way in which the valve arrangements 37 to 40 are controlled. So as to make this possible, the 2/2-way valves 44 and 45 have electromagnets 76 which are connected, in a manner which is not shown, to the control unit 36.

On the other hand, however, it is also possible to omit the throttles 48 and 49, together with the by-passes 46 and 47, and to use the 2/2-way valves 44 and 45, which are closed in their basic position, to separate the valve arrangements 37 to 40 hermetically from the power source 23 while no power-assisted brake operation is taking place. To this extent, draining of pressure medium from the wheel brakes 8 to 11 in the direction of the power source 23 is also avoided.

Because the power source 23 can be taken from the prior art, for example, it is sufficient to indicate that the pressure monitor 28 reports the degree of filling of the power reservoir 27 to the control unit 36 so that the latter can fill the power reservoir 27 by switching on the driving motor 24 and by driving the pump 25 and, on the other hand, stops the increase in pressure in the power reservoir 27 and avoids overloading of the driving motor 24. After the driving motor 24 has been switched off, the non-return valve 26 has the effect that the power reservoir 27 cannot be emptied through the pump 25 in the direction towards the reservoir 7. A safety valve 26a is installed between the power reservoir 27 and the reservoir 7 in order to secure against overloading of the driving motor 24.

Mode of operation of the power-assisted brake system

Let it be assumed, for the moment, that a supply of electric energy to the control unit 36 is not taking place for some reason or other. All the directional valves represented in FIG. 1 are then located in the basic positions shown. Hydraulic through connections therefore exist between the emergency brake pressure source 6 and the wheel brakes 8 to 11 through the emergency brake main conduits 12 and 13 and the emergency brake conduits 14 and 15, 16, 17, the 2/2-way valves 54 and 70 located in these conduits being open, as already mentioned. On actuation of the emergency brake pressure source 6 by means of the pedal 3, it is therefore possible to make brake pressures available to the wheel brakes 8 to 11. Depending on the weight of the vehicle equipped with such a vehicle brake system and on the degree of comfort desired in emergency braking operation, the vacuum-operated servo brake 5 may be associated with the emergency brake pressure source 6 or it may be omitted for price reasons.

If the electrical energy supply is in order, the control unit 36 can connect the driving motor 24 electrically to the electrical energy source quoted and, by this means, drive the pump 25 as soon as the vehicle equipped with the control unit 36 is made ready for operation by means of an ignition key. By means of pressure medium from the reservoir 7, the pump 25 fills the power reservoir 27 and increases the pressure there to a desired supply pressure. The attainment of the pressure is monitored by means of the pressure monitor 28. The control unit 36 can be activated to carry out power-assisted braking actions from a selected lower pressure. This takes place when a driver actuates the pedal 3 so that the required brake pressure value generator 35 reports a displacement of the pedal rod 4 to the control unit 36. By this means, the control unit 36 recognizes that the wheel brakes 8 to 11 have now to be isolated from the emergency brake pressure source 6 and have now to be actuated by pressure medium from the power source 23 by means of the valve arrangements 29 and 30. A displacement sensor is used as the required brake pressure value generator 35 in the present case. So that sufficiently long pedal paths or displacements of the pedal rod 4 occur despite the separation of the wheel brakes 8 to 11 from the emergency brake pressure source 6, which can be designed in the manner of a main brake cylinder, the displacement simulator connecting valve 53 is opened by means of the electromagnet 66 so that the displacement simulator 52 can take up quantities of pressure medium as a function of pressure supplied, in a manner known per se. The driver can therefore generate pressures of greater or lesser magnitude in the displacement simulator against the elastic resistance thereof; and the required brake pressure value generator 35, which is configured as a displacement sensor, acts in an indirect manner by means of the relationship between the pressure respectively present in the displacement simulator 52 and the proportional displacement of the pedal rod 4. On the other hand, however, it is also possible to use a directly acting required brake pressure value generator 35a in the form of a pressure sensor in connection with the emergency brake pressure generator 6, as in the prior art in accordance with the introduction to the description.

Apart from the wheel brakes 8 to 11 being shut off, as mentioned, relative to the emergency brake pressure source 6 when the pedal 3 is actuated, the wheel brakes 8 to 11 are also connected to the return conduit 59 and, by this means, to the reservoir 7. In consequence, the wheel brakes 8 to 11 are initially unpressurized because of the normally open 2/2-way valves 70. This is indicated to the control unit 36 by the wheel brake pressure sensors 31, 32, 33 and 34. In consequence, the wheel brake pressure sensors 31 to 34 are used as actual brake pressure value generators. With the present assumption, the control unit 36 recognizes that a brake pressure desired by the driver by actuation of the pedal 3 and requested by the required brake pressure value generator 35 is lacking in the wheel brakes 8 to 11 which are in communication with the reservoir 7. In consequence, the control unit 36 drives the 2/2-way valves 70 mentioned into their shut-off positions and opens the other 2/2-way valves 72 so that the wheel brakes 8 to 11 obtain pressure medium from the power source 23 through the throttles 48 and 49 and the 2/2-way valves 72, with the result that brake pressures occur and rise in the wheel brakes 8 to 11. The respective magnitude of the brake pressure in each of the wheel brakes 8 to 11 is reported by associated actual brake pressure value generators 31 and 32 and 33 and 34 to the control unit 36. The latter then recognizes that originally present differences between the required brake pressure values and actual brake pressure values are becoming smaller or have even disappeared. Once the differences have respectively become sufficiently small or have disappeared, the control unit 36 terminates the supply of pressure medium from the power source 23 to the respective wheel brakes 8 to 11 by closing the respectively associated 2/2-way valve 72. This takes place because the respective electromagnet 73 of the latter no longer receives any control current. If the brake pedal 3 is held still, a braking effect is therefore set in the wheel brakes 8 to 11, this braking effect then remaining initially practically constant.

If the driver permits the pedal 3 to return at least partially in the direction of the initial position, the magnitude of the signal reported by the required brake pressure value generator 35 decreases and the control unit 36 recognizes that the indications of actual brake pressure values from the actual brake pressure value generators 31 to 34 are now larger and that, therefore, brake pressures in the wheel brakes 8 to 11 are instantaneously too high. The control unit 36 therefore drives the 2/2-way valves 70, which have been held closed up to then by means of the electromagnets 71, back into their normally open position with the result that quantities of pressure medium escape from the wheel brakes 8 to 11 through the emergency brake conduits 14 to 7 and the emergency brake main conduits 12 and 13 to the reservoir 7 so that the wheel brake pressures sink. The control unit 36 monitors the manner in which the actual brake pressure values now sink and how they approach the instantaneously present required brake pressure value. When the approach is sufficiently close, the control unit 36 may then close the 2/2-way valves 70 again by means of the electromagnets 71. This is, for example, the case where there is a transition from full braking to partial braking. If, however, the pedal 3 is released completely, the control unit 36 recognizes this and it will no longer drive the 2/2-way valves 70 into the closed positions when the pressures in the wheel brakes 8 to 11 sink to the value "practically zero". In consequence, at least these 2/2-way valves 70 are in the basic position which is used for emergency brake operation, should this be necessary. Subsequently, the control unit 36 also permits the 2/2-way valves 54, the 2/2-way valves 56 and the displacement simulator connecting valve 53 to return to their basic positions with the result that the two emergency brake main conduits 12 and 13 between the emergency brake pressure sources 6 and the wheel brakes 8 to 11 again provide passages for emergency brake operation and pressure medium drainage into the displacement simulator 52, which is undesirable in emergency brake operation, is prevented.

As is taught in the publication DE 31 31 856 A1, the vehicle hydraulic brake system 2 of FIG. 1 can be further developed to carry out anti-lock protection operation automatically. For this purpose, wheel rotation sensors 80 to 83 are allocated to the wheels (which are not represented) and these wheel rotation sensors 80 to 83 are connected to the control unit 36, as is represented in the case of the wheel rotation sensor 83. The control unit 36 then additionally contains a logic circuit which recognizes, from sequences of wheel rotation signals from the wheel rotation sensors 80 to 83, whether a danger of the braked wheels locking is present and which, in consequence, lowers brake pressures (separately and individually for each wheel brake 8 to 11, for example) in at least one of the wheel brakes 8 to 11 to below such values as have been preselected by the driver by adjusting the required brake pressure value generator 35. The 2/2-way valve 70 is again used for reducing the brake pressure. The difference from the previously described power-assisted braking procedure now consists in the fact that when the danger of wheel lock is present, the control unit 36 ignores the required brake pressure value which has been set too high by the driver and now controls the valve arrangements 37 and 38 and 39 and 40 to achieve a variation in wheel rotation which avoids the danger of wheel lock. It is not necessary to deal with the relevant details here because the design of brake systems for carrying out anti-lock protection operation is known from many sorts of configuration examples.

While following the teaching of the prior art, this vehicle hydraulic brake system can also be further developed to carry out drive-slip control operation by selective braking of driving wheels, which are not represented. Because of the four arrangements of valve arrangements 37 to 40 represented, this vehicle hydraulic brake system is also suitable where the driving wheels are associated with two different brake circuits or where, for example, four driving wheels are provided on the vehicle.

Thanks to the four valve arrangements 37 to 40 distributed among four wheels, further development of the control unit 36 makes this vehicle brake system also suitable for carrying out vehicle dynamics control; it is possible to generate yaw direction changes influencing the driving behavior of the vehicle by braking individual wheels in accordance with the prior art. On the other hand, however, it is also possible to specify required brake pressure values which are different for the front and rear wheel brakes on the basis of a stroke of the pedal 3 selected by the driver and to set them by using the valve arrangements 37 to 40 and the associated actual brake pressure value generators 31 to 34, as is also taught by the prior art. In addition, it is possible to design the control unit 36 in such a way that vehicle decelerations occur which are proportional to an adjustment of the pedal rod 4.

Figure 4:
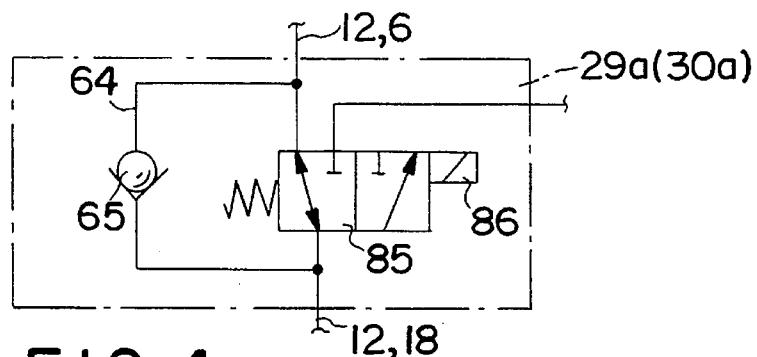

The principle, in accordance with the invention, of using at least partial lengths of emergency brake main conduits and the complete lengths of the emergency brake conduits 14 and 15 and 16 and 17 associated with the wheel brakes is not tied to the designs of the valve arrangements 29, 30 and 37 to 40 represented in FIG. 1. As an example, the valve arrangements 29 and 30 can be replaced by valve arrangements 29a and 30a in the form of so-called 3/2-way valves 85 as shown in FIG. 4. For this purpose, 3/2-way valves can be extracted from the prior art. In the basic position, the 3/2-way valve 85 connects the emergency brake pressure source 6 to the wheel brake 8 through, for example, the emergency brake main conduit 12.

In a manner which supports the invention, it is possible for a by-pass 64 with a non-return valve 65, which can be opened to the emergency brake pressure source 6, to be led around the 3/2-way valve 85, as has already been explained in the case of FIG. 1. The 3/2-way valve 85 can, for example, be controlled by means of an electromagnet 86. The choice between the valve arrangements of FIG. I and those of FIG. 4 is left to the specialist.

Figure 5:
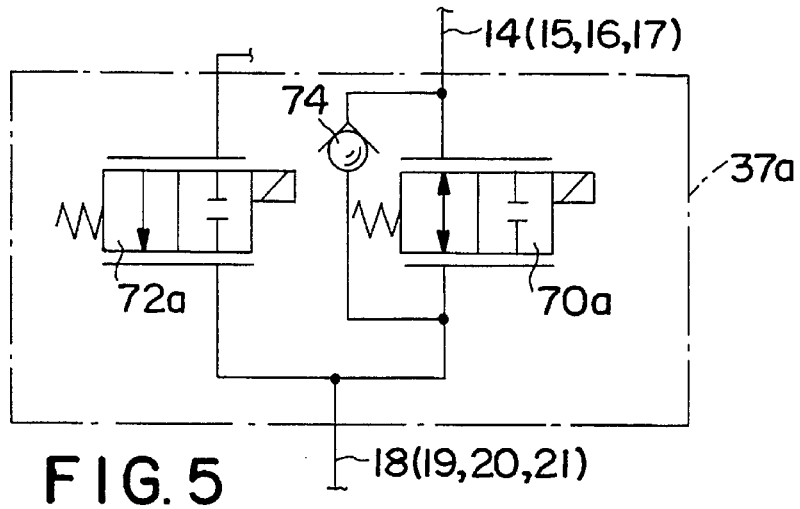

The valve arrangement 37 represented in FIG. 1 can be replaced by a valve arrangement 37a, as shown in FIG. 5. In the latter case, a proportional directional valve 70a is provided instead of the 2/2-way valves already described with positions "normally open" and "driven shut" and a proportional directional valve 72a is provided instead of the normally closed and driven open 2/2-way valve 72. The non-return valve 74 of the valve arrangement 37 can, for example, be appropriately taken over into the valve arrangement 37a and again laid as a by-pass around the proportional directional valves 70a. The proportional directional valves 70a and 72a are valves whose positions can be steplessly varied between their end positions. The valve arrangement 37a of FIG. 5 can also be substituted for the valve arrangements 38, 39 and 40. The advantages of joltless rates of brake pressure change, which can be set to different levels as described in the publication DE 40 29 793 A1, are possible when using the valve arrangement 37a with corresponding further development of the control unit 36.

Figure 6:
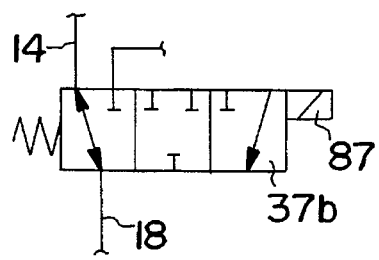
Figure 7:
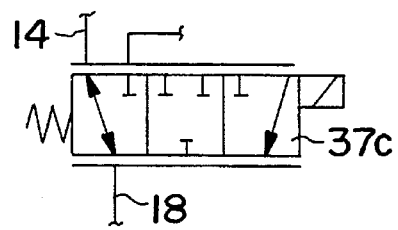

A valve arrangement 37b, which is configured in the form of a so-called 3/3-way valve with an electromagnet 87, can be used as an alternative to the valve arrangements 37 and 37a represented in FIG. 1 and in FIG. 5. The 3/3-way valve 37b is therefore likewise suitable for increasing brake pressure, maintaining brake pressure constant and reducing brake pressure. In order to achieve the advantage quoted for the valve arrangement 37a of FIG. 5, the valve arrangement 37b of FIG. 6 can be converted into a 3/3-way proportional/ directional valve arrangement 37c for continuous transitions from one function into the respectively adjacent function of the three functions represented.

It may therefore be seen that the essential feature of the invention—using emergency brake main conduits on a part of their length for draining pressure medium from the power-assisted brake operation—can be realized with differently designed valve arrangements. As already indicated, this essential idea of the invention can also be realized independently of whether each of the wheel brakes 8 to 11 has its own valve arrangement 37 or 38 or 39 or 40 associated with it or whether, for example, only one common valve arrangement for changing wheel brake pressures is possible for the wheel brakes of two rear wheels, whether these changes to wheel brake pressures are used in power-assisted brake operation or in anti-lock protection operation.

The foregoing relates to preferred exemplary embodiments of the invention, it being understood that other variants and embodiments thereof are possible within the spirit and scope of the invention, the latter being defined by the appended claims.

We claim:

1. A vehicle hydraulic brake system which comprises a twin circuit emergency brake pressure source which can be put into operation by a pedal, wheel brakes which can be supplied from the emergency brake pressure source, emergency brake main conduits laid as a twin circuit and extending from the emergency brake pressure source to the wheel brakes and with a power-assisted brake device which can be controlled electrically by means of the pedal, said brake device has at least one fluid pump which can be supplied from a reservoir, a power reservoir which can be charged by said at least one pump, and at least one controllable first valve arrangement (29, 30) per brake circuit, for the selection of a brake pressure source, between the emergency brake pressure source and wheel brakes and said brake device has at least one electrically controllable second valve arrangement (37, 38, 39, 40, 37a, 37b, 37c), for brake pressure setting, a required brake pressure value generator (35) which can be controlled by means of the pedal, and a control unit (36) connected to the required brake pressure value generator (35), said control unit (36) controls the at least one second valve arrangement (37, 38, 39, 40, 37a, 37b, 37c in order to generate brake pressures from the energy of the power source and to change these brake pressures, wherein the at least one first valve arrangement (29, 30) for selecting the brake pressure sources (6, 23) is arranged to open the associated emergency brake main conduits (12, 13) to a return conduit (59) which leads to the reservoir (7), wherein the at least one second valve arrangement (37, 38, 39, 40, 37a, 37b, 37c) is connected to the emergency brake main conduits (12, 13) and at least one of the wheel brakes (8, 9, 10, 11) to set brake pressures while relaying a pressure medium from the power source (23) and is arranged in such a way that said at least one second valve arrangement connects the emergency brake main conduits (12, 13) to the wheel brakes (8, 9, 10, 11) when no electrical current is applied to the at least one electromagnet (71, 73, 83) and separates the wheel brakes (8, 9, 10, 11) from the power source (23) and, in power-assisted brake operation, connects the wheel brakes (8, 9, 10, 11) to the power source (23) for the purpose of a brake pressure increase and to the emergency brake main conduits (12, 13), which can be opened to the reservoir (7), for the purpose of brake pressure reduction.

2. The vehicle hydraulic brake system as claimed in claim 1, wherein the at least one controllable first valve arrangement (29, 30) used for the selection of the brake pressure source has a normally open 2/2-way valve (54) in the emergency brake main conduits (12, 13) and has a normally closed 2/2-way valve (56) which is connected to the emergency brake main conduit (12, 13) and can be opened to the return conduit (59).

3. The vehicle hydraulic brake system as claimed in claim 2, wherein the 2/2-way valves (54, 56) are configured as set valves, wherein a connection (A) on a valve seat end of the normally open 2/2-way valve (54) is connected at the emergency brake pressure source end to the emergency brake main conduits (12, 13), wherein a connection on the valve seat end of the normally closed 2/2-way valve (56) is connected to the return conduit (59) and through the latter to the reservoir (7) and wherein a by-pass (64) with a non-return valve (65) which can be opened in a direction towards the emergency brake pressure source (6) is arranged around the normally open 2/2-way valve (54).

4. The vehicle hydraulic brake system as claimed in claim 1, wherein the at least one controllable first valve arrangement (29a) for the selection of the brake pressure source is configured as a 3/2-way valve (85), wherein in a normal position of the latter, the emergency brake pressure source (6) is connected to at least one of the wheel brakes (8, 9, 10, 11) and, in the controlled position, at least one of the wheel brakes (8, 9, 10, 11) is connected to the reservoir (7) through a partial length of the emergency brake main conduits (12, 13) and the return conduit (59).

5. The vehicle hydraulic brake system as claimed in claim 4, wherein the 3/2-way valve (85) is configured as a seat valve and wherein a by-pass (64) which by-passes the 3/2-way valve (85) and which has a non-return valve (65) which can be opened towards the emergency brake pressure source (6) is arranged on the emergency brake conduits (12, 13).

6. The vehicle hydraulic brake system as claimed in claim 1, wherein the at least one second valve arrangement (37, 38, 39, 40) for setting brake pressure in power-assisted brake operation comprises a normally open 2/2-way valve (70) between the emergency brake pressure source (6) and at least one of the wheel brakes (8, 9, 10, 11) and 6f a normally closed 2/2-way valve (72) between at least one of the wheel brakes (8, 9, 10, 11) and the power source (23).

7. The vehicle hydraulic brake system as claimed in claim 6 wherein the 2/2-way valves are configured as proportional directional valves (70a, 72a).

8. The vehicle hydraulic brake system as claimed in claim 7, wherein the directional valve (70a, 72a, 37c) is configured as a seat valve and wherein a by-pass (75) with a built-in non-return valve (74) is associated with this seat valve, for flow to take place through the non-return valve (74) from the emergency brake pressure source (6) the non-return valve opens towards at least one of the wheel brakes (8, 9, 10, 11).

9. The vehicle hydraulic brake system as claimed in claim 1, wherein the at least one second valve arrangement for setting wheel brake pressure while using the power source (23) is configured as a 3/3-way valve (37b) which connects the emergency brake pressure source (6) to at least one of the wheel brakes (8, 9, 10, 11) in the normal position, which separates at least one of the wheel brake (8, 9, 10, 11) from the emergency brake main conduits (12, 13) and the power source (23) in a second position and connects the at least one of the wheel brakes (8, 9, 10, 11) to the power source (23) in the third position.

10. The vehicle hydraulic brake system as claimed in claim 9 wherein the 3/3-way valve is configured as a 3/3-way proportional/direction valve (37c).

11. The vehicle hydraulic brake system as claimed in claim 10, wherein the directional valve (70a, 72a, 37c) is configured as a seat valve and wherein a by-pass (75) with a built-in non-return valve (74) is associated with this seat valve, for flow to take place through the non-return valve (74) from the emergency brake pressure source (6) the non-return valve opens towards at least one of the wheel brakes (8, 9, 10, 11).

12. The vehicle hydraulic brake system as claimed in claim 1, wherein the power source (23) is connected to the at least one second valve arrangement (37 and 38, 39 and 40, 37a, 37b, 37c) via a branch (41) and two subsequent non-return valves (50 and 51).

13. The vehicle hydraulic brake system as claimed in claim 12, wherein one normally closed 2/2-way valve (44 or 45) is introduced between the branch (41) and each of the non-return valves (50 and 51).

14. The vehicle hydraulic brake system as claimed in claim 13, wherein by-passes (46 and 47) with built-in throttles (48 and 49) are laid around the 2/2-way valves (44 and 45).

15. The vehicle hydraulic brake system as claimed in claim 1, wherein the emergency brake pressure source (6) can be connected to a displacement simulator (52), which is effective in power-assisted brake operation, by a normally closed 2/2-way valve of a type of a displacement simulator connecting valve (53).

16. The vehicle hydraulic brake system as claimed in claim 15, wherein the brake pressure value generator (35) is configured as a pick-up, such as a displacement pick-up or pivoting angle pick-up, which is mechanically coupled to the pedal (3).

17. The vehicle hydraulic brake system as claimed in claim 1, wherein the control unit (36) intended for power-assisted brake operation is further developed for an additional control of at least one functional mode of an anti-lock protection, drive-slip control operation, braking force distribution between front and rear wheel brakes, vehicle dynamics control and electrical deceleration control proportional to an actuation of the pedal (30).

\* \* \* \* \*